United States Patent [19]
Coker

[11] Patent Number: 4,538,532
[45] Date of Patent: Sep. 3, 1985

[54] ANHYDROUS AMMONIA FERTILIZER APPLICATOR

[76] Inventor: Clyde R. Coker, Rte. 1, Rosebud, Tex. 76570

[21] Appl. No.: 541,415

[22] Filed: Oct. 13, 1983

[51] Int. Cl.³ .............................................. A01L 23/00
[52] U.S. Cl. ........................................ 111/7; 172/166
[58] Field of Search ..................... 111/1, 7, 77, 73, 80, 111/85, 86; 172/166

[56] References Cited

U.S. PATENT DOCUMENTS

| | | | |
|---|---|---|---|
| 3,237,577 | 3/1966 | Wilkins | 111/7 |
| 3,292,562 | 12/1966 | Clark | 111/7 |
| 3,542,137 | 11/1970 | Mai | 111/7 X |
| 3,745,944 | 7/1973 | Yetter et al. | 111/7 |
| 3,752,092 | 8/1973 | Vinyard | 111/7 |
| 3,752,238 | 8/1973 | Chilton | 172/180 |
| 3,799,079 | 3/1974 | Dietrich | 172/145 |

FOREIGN PATENT DOCUMENTS 2075811 9/1981 United Kingdom ................. 111/73

*Primary Examiner*—Robert A. Hafer
*Assistant Examiner*—Danton D. DeMille
*Attorney, Agent, or Firm*—Harvey B. Jacobson

[57] ABSTRACT

An anhydrous ammonia fertilizer applicator for applying fertilizer to the root system of Bermuda grass and the like and which includes a rolling coulter which will cut through Bermuda grass roots, debris and the like in front of an applicator knife disposed in immediate trailing relation to the rolling coulter. The applicator knife includes a hose or pipe connected to the rear edge thereof and adapted to be communicated with a source of supply of anhydrous ammonia fertilizer for discharging the fertilizer closely adjacent the bottom of the slot or groove formed in the soil by the rolling coulter so that the anhydrous ammonia fertilizer will not "gas out" and escape as might occur if uncut roots, debris and the like form a relatively wide trench in the soil surface which would permit the anhydrous ammonia fertilizer to easily vaporize into a gas and escape from the soil thus producing no benefit to the root system of Bermuda grass and the like. A unique mounting system is provided for the coulter and knife to support a plurality of such assemblies from a tool bar or other supporting structure carried from a farm tractor or the like by conventional mechanism to enable the elevational position of the applicator to be varied in relation to the ground surface.

1 Claim, 4 Drawing Figures

U.S. Patent  Sep. 3, 1985  4,538,532
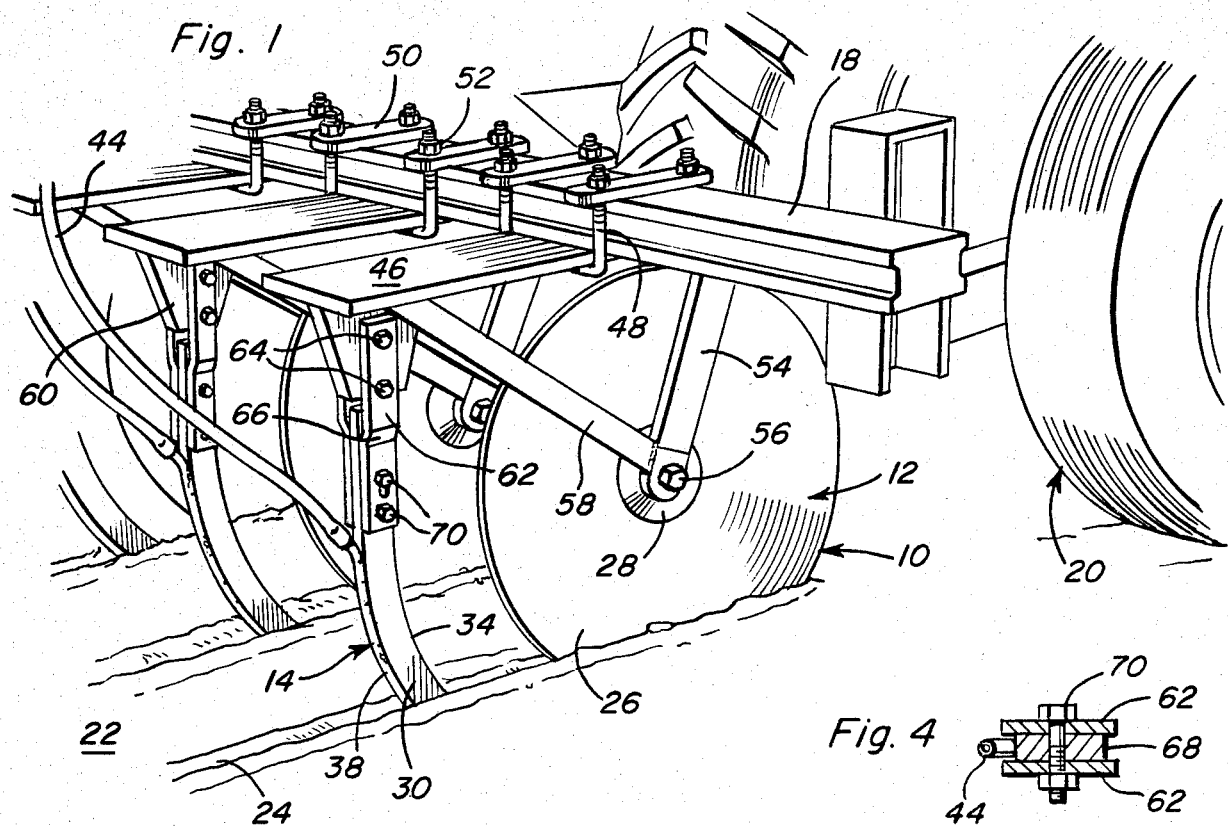
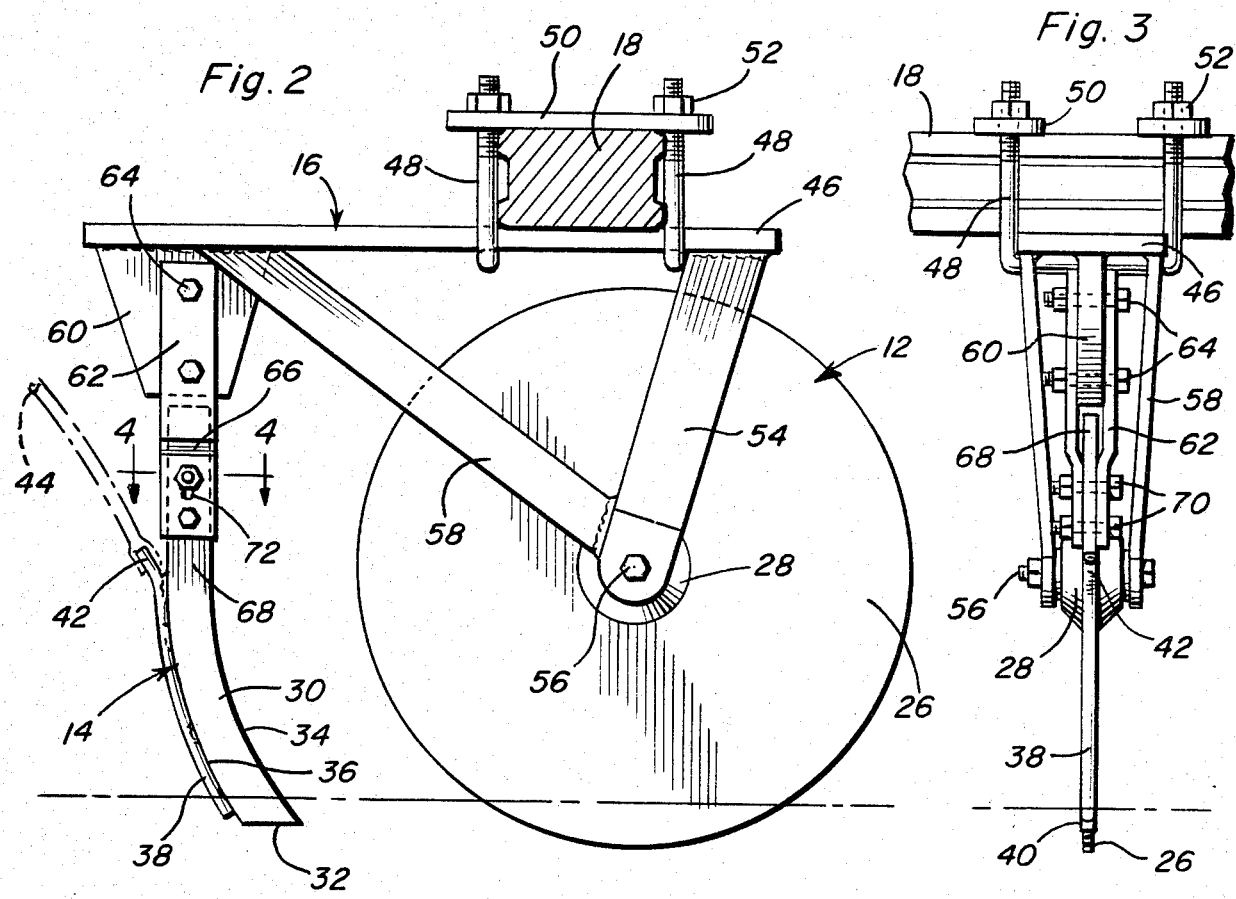

ANHYDROUS AMMONIA FERTILIZER APPLICATOR

BACKGROUND OF THE INVENTION

1. Field of the Invention

The present invention generally relates to devices for injecting liquids such as anhydrous ammonia fertilizer or other types of liquid fertilizer into the soil at a depth adjacent to the root system of the plants intended to be fed by the fertilizer. The present invention includes a rolling coulter in the form of a circular disk which will form a groove in the soil to a desired depth with an applicator knife immediately trailing the coulter and provided with a hose or other conduit along the trailing edge thereof for discharging anhydrous ammonia fertilizer or other liquid fertilizer adjacent the bottom of the groove formed by the coulter. The formation of a groove or slit in the ground surface eliminates roots and debris hanging on an applicator knife and dragging out a wide trench like cavity which would enable anhydrous ammonia fertilizer and the like to immediately vaporize into gas and escape thereby being ineffective for feeding the root system of the plants. Also, the coulter cutting through the root system and debris materially reduces the collection of such materials on the applicator knife thereby enabling a more efficient application of anhydrous ammonia in Bermuda grass fields where conventional applicators do not perform properly or in fields with excessive crop residue or minimum tillage operations.

2. Description of the Prior Art

Applicator knives have been provided for applying anhydrous ammonia or other liquid fertilizers below the ground surface with the following U.S. Pat. Nos. relating to this field of endeavor.

2,598,121 May 27, 1952;
3,237,577 Mar. 1, 1966;
3,799,079 Mar. 26, 1974;
4,056,226 Nov. 1, 1977.

SUMMARY OF THE INVENTION

An object of the present invention is to provide an anhydrous ammonia fertilizer applicator consisting essentially of a rotatably journalled coulter engaging and penetrating the ground surface to provide a narrow groove or slit in the soil surface to a desired depth combined with an applicator knife disposed in trailing relation to the coulter for discharging anhydrous ammonia fertilizer at a point closely adjacent the bottom of the groove or slit formed in the soil surface by the rolling coulter.

Another object of the invention is to provide an anhydrous ammonia fertilizer applicator in accordance with the preceding object in which the rolling coulter will cut through debris on the soil surface such as that that may be encountered when a field has excessive crop residue or the field is involved in a minimum tillage operation with the coulter also cutting through root systems such as may be found in Bermuda grass fields thereby enabling the applicator knife to follow the coulter without debris, roots and the like hanging on the applicator knife and forming a relatively wide trench-like ditch or cavity which would enable the anhydrous ammonia fertilizer to vaporize and escape from the trench thereby reducing any benefit to the root system as intended by application of the anhydrous ammonia fertilizer.

A further object of the invention is to provide an applicator for liquid and anhydrous ammonia fertilizer in accordance with the preceding objects having a rigid bracket structure of simple construction mounting the coulter and knife from a transverse tool bar or the like supported from a farm tractor with a plurality of similar applicators also being supported on the tool bar in mutually spaced relation for efficiently applying anhydrous ammonia fertilizer or liquid fertilizer into grooves or slits formed in the ground surface so that the fertilizer will be retained in the ground to feed the plant root system rather than vaporizing into a gas and escaping which can occur when relatively wide trenches are formed by debris and roots hanging onto the applicator knives and dragging along the ground surface.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the anhydrous ammonia fertilizer applicator of the present invention illustrating its association with a plurality of similar applicators supported from a tool bar connected with a farm tractor in a conventional manner.

FIG. 2 is a side elevational view of the applicator of the present invention.

FIG. 3 is a rear elevational view of the applicator.

FIG. 4 is a sectional view taken along section line 4—4 on FIG. 2 illustrating the mounting structure for the applicator knife.

DESCRIPTION OF THE PREFERRED EMBODIMENT

Referring now specifically to the drawings, the anhydrous ammonia fertilizer applicator of the present invention is generally designated by reference numeral 10 and includes a circular rotatably supported coulter 12 and an applicator knife 14 supported from a bracket structure 16 from a transversely extending tool bar 18 supported in a conventional manner from a farm tractor 20 so that the applicator can be moved over the ground surface 22 such as the surface of a field of Bermuda grass or a field having excessive crop residue or one which is involved in minimum tillage operations with the coulter 12 forming a narrow slit or groove 24 in the soil surface 22.

The rolling coulter 12 is in the form of a relatively thin, circular plate or disk 26 having a centrally disposed hub 28 which may be provided with ball bearings or the like with the periphery of the disk 26 being relatively thin or narrow in order to form a groove or slit trench 24 in the ground surface 22.

The fertilizer knife 14 includes an elongated bar member 30 which is arcuately curved forwardly from its upper end to a lower end 32 that is spaced slightly above the bottom periphery of the disk 26 as illustrated in FIG. 2. The forward edge of the member 30 is concave at 34 and is in alignment with and trailing relation to the periphery of the disk 26 with the concavity of the forward edge 34 generally following the curvature of the disk 26. The rear edge of the member 30 is convex as at 36 and is provided with a tube or pipe 38 secured thereto which terminates in a discharge end 40 adjacent the lower tip end 32 of the member 30 for discharging anhydrous ammonia fertilizer or other liquid fertilizer into the groove or slit 24 at a depth only slightly above the bottom of the groove or slit 24 which is formed by the disk 26. The upper end of the hose or pipe 38 is rearwardly inclined at 42 for connection with a hose 44 which extends to and is communicated with an anhydrous ammonia fertilizer meter or other supply source.

The bracket 16 includes an elongated flat plate 46 having its forward end underlying the tool bar 18 which may be a tubular rectangular member or solid rectangular member or the like with a pair of U-bolts 48 extending under the plate 46 and alongside the front and rear of the tool bar with a retainer plate 50 engaging the U-bolts 48 which secures the bracket 16 adjustably on the tool bar by the use of nuts 52 in a conventional and well known manner. Depending from the forward end of the plate 46 is a pair of bar-like bracket members 54 which converge downwardly and inwardly as illustrated in FIG. 3 with the lower ends thereof receiving a fastening bolt 56 which forms an axle or spindle for the hub 28 of the disk 26. Adjacent the rear of the plate 46, a pair of downwardly and forwardly extending bar members 58 are rigidly secured to the plate 46 and extend forwardly and are joined with the lower end portions of the bar members 54 with both the bar members 54 and 58 converging downwardly in relation to each other as illustrated in FIG. 2 and also converging inwardly in relation to each other as illustrated in FIG. 3 thereby providing a generally V-shaped supporting assembly for the disk 26 for rotatably supporting the disk in a firm and secure manner with the rotational axis of the disk 26 being parallel to the tool bar 18.

The rear of the plate 46 is also provided with a depending centrally disposed mounting plate or lug 60 having a pair of mounting straps 62 secured thereto by bolts 64 with the straps 62 extending downwardly and being offset inwardly at 66 for receiving the upper end or shank end 68 of the knife member 30 therebetween with fastening bolts 70 extending through the lower ends of the straps 62 and the upper end of the shank 68 of the knife member 30. The straps 62 are provided with a slot 72 to accommodate bolt spacings between bolts 70 which vary for rigidly securing but detachably securing the knife member 30 to the plate 46 with the knife member 30 being directly in alignment with the disk 26 and having a thickness generally equal to or only slightly thicker than the thickness of the disk 26 so that the knife member 30 will easily follow the disk and be received in the groove or slit without creating excessive frictional drag against the ground surface.

The fertilizer applicator is especially useful in applying anhydrous ammonia to Bermuda grass fields with the disk 26 cutting through the above-ground grass and also cutting through the root system so that the anhydrous ammonia can be injected below ground surface at a desired level in relation to the root system. The narrow configuration of the groove or slit is such that the fertilizer discharged into the bottom thereof will not vaporize or "gas out" and escape which frequently occurs when conventional applicators are used and roots and debris hang onto the applicator and drag along the ground surface to drag out a relatively wide trench which allows the liquid fertilizer to easily vaporize and escape. The rolling coulter may be conveniently constructed with a 24 inch diameter and the depth of the groove or slit 24 may vary between two inches and ten inches depending upon the conditions encountered by the operator. The ammonia knife 14 may be approximately 18 inches in length and the construction of the knife allows the fertilizer to be applied within one inch of the bottom of the slit or trench formed by the coulter. The applicator is also especially useful to apply fertilizer in fields with excessive crop residue or in fields which are being used in a minimum tillage operation. Further, the applicator knife 14 may optionally include two tubes for applying liquid fertilizer in conjunction with anhydrous ammonia fertilizer. The components of the device are quite rigid but yet are simple in construction, long lasting and capable of easy assembly and disassembly and also capable of easy adjustment to orient the applicators in optimum position in relation to the tool bar and ground surface of the field to which fertilizer is being applied.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An applicator for discharging flowable anhydrous ammonia fertilizer below the surface of soil comprising a supporting structure adapted to be mounted from a tractor type vehicle for movement over the soil surface at an adjustable elevational relationship thereto, a generally circular coulter rotatably supported from the supporting structure for forming a narrow slot in the soil surface, a knife supported from the supporting structure in trailing aligned relation of the coulter for movement through the slot in close trailing relation to the coulter, and a conduit along the trailing edge of the knife, said conduit having a lower discharge end adjacent the lower end of the knife, said conduit being in communication with a supply of flowable anhydrous ammonia fertilizer for discharge thereof into the bottom of the slot formed by the coulter and knife to reduce the tendency of the fertilizer to "gas out", said knife having its lower edge generally in alignment with the lower periphery of the coulter for discharging the flowable anhydrous ammonia fertilizer in the bottom portion of the slot, said coulter being a substantially flat disc having a continuous peripheral edge to cut through surface debris, surface plants and below surface root systems thereby enabling the use of the apparatus in Bermuda grass fields, fields with crop residue and fields in minimum tillage procedures for applying anhydrous ammonia fertilizer below the soil surface, said supporting structure including a tool bar supporting a plurality of coulters and knives in spaced relation, and a plurality of bracket means adjustably mounted on the tool bar for supporting said coulters and knives therefrom, each of said bracket means including an elongated horizontal rectangular plate having its forward end secured in underlying relation to the tool bar, a pair of downwardly converging forward bracket members and a pair of downwardly converging rear bracket members with the forward and rear bracket members being rigid with the plate and converging toward each other and rigidly joined at their lower ends with the coulter including a hub received between the bracket members, an axle bolt extending through the hub and lower ends of the forward bracket members for rotatably journalling the coulter from the tool bar, each of said bracket means also including a depending mounting lug at the rear center of said plate, a pair of bracket strap members attached to said lug along opposite surfaces thereof and depending therefrom for receiving the upper end of the applicator knife therebetween, bolt means securing the upper end of the applicator knife between the bracket strap members to enable replacement and removal thereof, each of said applicator knives comprising an elongated bar having a rectangular cross section with the narrow edges facing forwardly and rearwardly and being in alignment with the coulter, said bar being arcuately curved and provided with a concave forward edge and a convex rearward edge with the concave forward edge being spaced from and generally paralleling a portion of the periphery of the coulter, a pair of U-bolts securing each plate to the tool bar with the U-bolts being disposed along the forward and rearward surfaces of the tool bar with the bight portion of the U-bolts receiving the plate, a pair of strap members overlying the tool bar and received on the upper threaded ends of the U-bolts to enable lateral adjustment of the plates and thus the coulters and discs along the tool bar, the bight portion of the forward U-bolt being received in the juncture between the forward bracket members and the plate to prevent rearward movement of the plate in relation to the tool bar, said rear bracket members being rigidly fixed to said plate in partially overlapping relation to the depending mounting lug whereby upward forces exerted on the mounting plate by the rear bracket members will counteract the downward forces exerted on that portion of the plate to which the rear bracket members are attached by the lug and the knife that is supported in depending relation thereto, said mounting lug having a thickness substantially greater than the thickness of the knife with the strap members having inwardly offset lower ends for surface-to-surface engagement with the knife, the lower ends of each of said strap members including a transverse aperture and a transverse slot vertically disposed above the aperture to receive mounting bolts having different spacings.

* * * * *